United States Patent
Shimono et al.

(10) Patent No.: US 10,423,857 B2
(45) Date of Patent: Sep. 24, 2019

(54) DETECTING APPARATUS FOR DETECTING SUBJECT

(71) Applicant: CASIO COMPUTER CO., LTD., Shibuya-ku, Tokyo (JP)

(72) Inventors: Tsutomu Shimono, Hamura (JP); Masayuki Endo, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 122 days.

(21) Appl. No.: 14/977,943

(22) Filed: Dec. 22, 2015

(65) Prior Publication Data
US 2016/0217580 A1    Jul. 28, 2016

(30) Foreign Application Priority Data
Jan. 28, 2015   (JP) ................................. 2015-013862

(51) Int. Cl.
G06K 9/52        (2006.01)
H04N 5/232       (2006.01)
G06K 9/00        (2006.01)
G06K 9/20        (2006.01)
(Continued)

(52) U.S. Cl.
CPC .......... *G06K 9/52* (2013.01); *G06K 9/00255* (2013.01); *G06K 9/2054* (2013.01); *G06K 9/228* (2013.01); *G06K 9/3208* (2013.01); *H04N 5/232* (2013.01); *H04N 5/23245* (2013.01)

(58) Field of Classification Search
CPC combination set(s) only.
See application file for complete search history.

(56) References Cited

U.S. PATENT DOCUMENTS 5,493,597 A * 2/1996 Gotoh ................... A61B 6/4476
                                                        378/147
5,900,909 A * 5/1999 Parulski ............... H04N 1/2112
                                                        348/231.6
(Continued)

FOREIGN PATENT DOCUMENTS

JP    05-107604     4/1993
JP    3234412      12/2001
(Continued)

OTHER PUBLICATIONS

Non-Final Office Action for Japanese Patent Application No. 2015-013862 dated May 17, 2016, 6 pages.
(Continued)

*Primary Examiner* — Anand P Bhatnagar
(74) *Attorney, Agent, or Firm* — Amin, Turocy & Watson LLP

(57) ABSTRACT

An imaging apparatus of an embodiment of the present invention includes an imaging means (an imaging unit), and a CPU that is configured to perform orientation detection (an orientation detecting unit) to detect an orientation of the imaging apparatus, perform subject detection (a detecting unit) to detect a subject in a detection area (a detection area in a live view image) in an image captured by the imaging means (the live view image), and perform position change (a position changing unit) to change the position of the detection area in the image according to the detected orientation of the imaging apparatus.

18 Claims, 9 Drawing Sheets

(51) Int. Cl.
  *G06K 9/22* (2006.01)
  *G06K 9/32* (2006.01)

(56) References Cited

U.S. PATENT DOCUMENTS

| | | | | |
|---|---|---|---|---|
| 6,370,330 | B2* | 4/2002 | Sekine | G01S 3/7864 348/E5.045 |
| 8,514,285 | B2* | 8/2013 | Yoshizumi | G03B 37/04 348/143 |
| 8,908,057 | B2* | 12/2014 | Yoshizumi | H04N 5/2251 348/169 |
| 2004/0125229 | A1* | 7/2004 | Aoyama | H04N 5/23212 348/345 |
| 2005/0020883 | A1* | 1/2005 | Chatenever | A61B 1/00045 600/173 |
| 2007/0268372 | A1* | 11/2007 | Kondo | G06K 9/4609 348/208.4 |
| 2009/0268943 | A1* | 10/2009 | Yoshizumi | H04N 5/23222 382/103 |
| 2010/0024531 | A1* | 2/2010 | Senoo | A63B 24/0021 73/65.01 |
| 2011/0019021 | A1* | 1/2011 | Yoshizumi | H04N 5/2251 348/222.1 |
| 2011/0157394 | A1* | 6/2011 | Yoshizumi | G03B 37/04 348/222.1 |
| 2011/0157397 | A1* | 6/2011 | Yoshizumi | G03B 17/38 348/222.1 |
| 2013/0002923 | A1* | 1/2013 | Kanma | G01C 17/28 348/333.02 |
| 2014/0055636 | A1* | 2/2014 | Yoshizumi | G03B 17/38 348/222.1 |
| 2015/0078138 | A1* | 3/2015 | Ito | G07C 1/10 368/9 |
| 2016/0044222 | A1* | 2/2016 | Endo | H04N 5/23293 348/208.16 |

FOREIGN PATENT DOCUMENTS

| | | |
|---|---|---|
| JP | 2005-333420 | 4/2007 |
| JP | 2007-110575 | 4/2007 |
| JP | 2010-088093 | 4/2010 |
| JP | 2010-153954 | 7/2010 |
| JP | 2010-183254 | 8/2010 |
| JP | 2014-030163 | 2/2014 |

OTHER PUBLICATIONS

Japanese Office Action for Japanese Patent Application No. 2015-013862 dated Sep. 27, 2016.

* cited by examiner

FIG. 3C

| COORDINATE CORRECTION INFORMATION ||
|---|---|
| CHANGE IN ORIENTATION | CONTENTS OF CORRECTION |
| FROM SIDEWAY TO UPRIGHT | (i) VALUE OF X COORDINATE IS SMALLER THAN 1/2X<br>→ ADD \|X-Y\|/2 TO X COORDINATE<br>(ii) VALUE OF X COORDINATE IS 1/2X<br>→ NO CORRECTION |
| FROM UPRIGHT TO SIDEWAY | (iii) VALUE OF X COORDINATE IS GREATER THAN 1/2X<br>→ SUBTRACT \|X-Y\|/2 FROM X COORDINATE |

7c

DETECTING APPARATUS FOR DETECTING SUBJECT

CROSS-REFERENCE TO RELATED APPLICATIONS

This application is based upon and claims the benefit of priority under 35 USC 119 of Japanese Patent Application No. 2015-013862 filed on Jan. 28, 2015, the entire disclosure of which is incorporated herein by reference in its entirety for all purposes.

BACKGROUND OF THE INVENTION

1. Field of the Invention

The present invention relates to a detecting apparatus, a detection control method, and a computer readable recording medium for recording a program thereon.

2. Description of the Related Art

Conventionally, there has been disclosed an automatic shooting function provided in an imaging apparatus such as a digital camera for detecting movements of a subject in a predetermined area (a detection area) within the screen of the imaging apparatus and automatically releasing the shutter (hereinafter, referred to as a "motion shutter"), for example, in Japanese Patent Application Laid-Open Publication No. 2005-333420 published on Dec. 2, 2005.

SUMMARY OF THE INVENTION

In order to achieve the above object, an embodiment of the present invention provides a detecting apparatus for detecting a subject including an imaging unit, and a CPU that is configured to perform orientation detection to detect an orientation of the detecting apparatus, perform subject detection to detect a subject in a predetermined detection area in an image captured by the imaging unit, and perform position change to change the position of the predetermined detection area in the image according to the detected orientation of the detecting apparatus.

In order to achieve the above object, an embodiment of the present invention provides a detection control method performed by a detecting apparatus including detecting an orientation of the detecting apparatus including an imaging unit, detecting a subject in a predetermined detection area in an image captured by the imaging unit, and changing the position of the predetermined detection area in the image according to the detected orientation of the detecting apparatus.

In order to achieve the above object, an embodiment of the present invention provides a non-transitory computer-readable recording medium for recording a computer program, the computer program causing a processor of a detecting apparatus to execute functions including an orientation detecting function for detecting an orientation of the detecting apparatus including an imaging unit, a subject detecting function for detecting a subject in a predetermined detection area in an image captured by the imaging unit, and a position changing function for changing the position of the predetermined detection area in the image according to the orientation of the detecting apparatus detected by the orientation detecting function.

Here, the image captured by the imaging unit includes images of different aspect ratios such as 4:3, 16:9, or 1:1.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The present invention will more sufficiently be understood by the following detailed description and the accompanying drawings.

Here:

FIG. 3C shows contents of coordinate correction information.

DETAILED DESCRIPTION OF THE PREFERRED EMBODIMENT

Hereinafter, embodiments of the present invention will be described with reference to the accompanying drawings. The scope of the invention is not intended to be limited to the illustrated examples.

Figure 1:
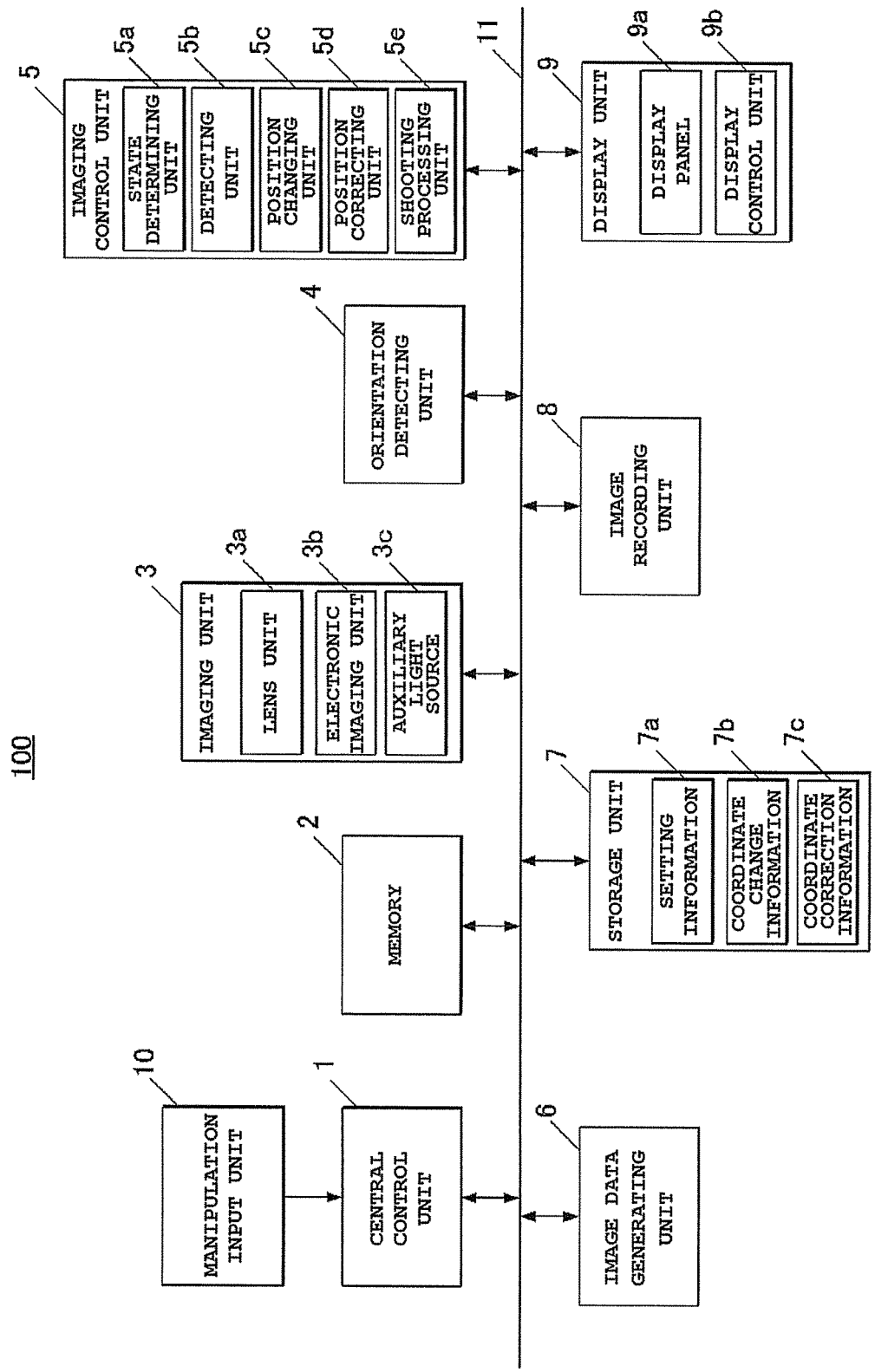
FIG. 1 is a block diagram showing an outlined configuration of an imaging apparatus according to a first embodiment to which the present invention is applied.
Figure 2A:
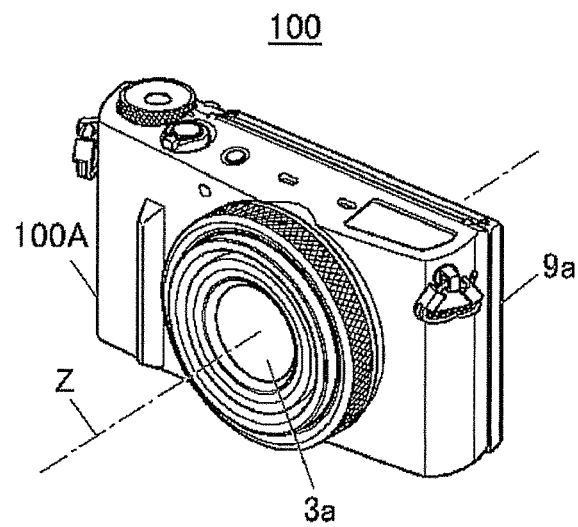
FIGS. 2A and 2B are perspective views depicting the imaging apparatus of FIG. 1 schematically.

FIG. 1 is a block diagram showing an outlined configuration of an imaging apparatus 100 according to an embodiment of the present invention. FIG. 2A is a perspective view schematically depicting the imaging apparatus 100 of FIG. 1 and FIG. 2B is a perspective view schematically depicting a state in which a display panel 9a of the imaging apparatus 100 is rotated by 180°.

As shown in FIG. 1, the imaging apparatus 100 of the present embodiment includes a central control unit 1, a memory 2, an imaging unit 3, an orientation detecting unit 4, an imaging control unit 5, an image data generating unit 6, a storage unit 7, an image recording unit 8, a display unit 9, and a manipulation input unit 10.

Further, the central control unit 1, the memory 2, the imaging unit 3, the orientation detecting unit 4, the imaging control unit 5, the image data generating unit 6, the storage unit 7, the image recording unit 8, and the display unit 9 are connected via a bus line 11 with each other.

Figure 2B:
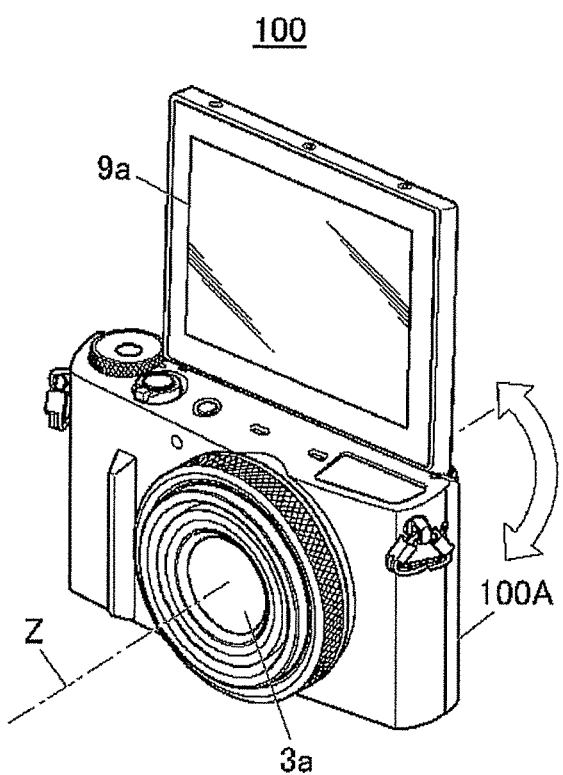

As shown in FIGS. 2A and 2B, the display panel 9a of the display unit 9 (which will be described later) is connected through a rotation mechanism (for example, a hinge mechanism) to the main body 100A of the imaging apparatus 100 which includes the imaging unit 3 (in particular, a lens unit 3a which will be described later). More specifically, the display panel 9a is pivotally supported to the main body 100A so that it can rotate by about 180° around an axis lying approximately at right angles to the direction of an optical axis Z (for example, an axis of the horizontal direction). Thus, by rotating the display panel 9a by about 180° with respect to the main body 100A, the display panel 9a can be placed facing a subject like an exposed face of the lens unit 3a so that the display direction of the display panel 9a is almost the same as the imaging direction of the imaging unit 3 (see FIG. 28). When the display panel 9a looks the same direction as the exposed face of the lens unit 3a, a user can visually recognize an image including oneself displayed in the display panel 9a to take a self-portrait (a so-called selfie).

Alternatively, the display panel 9a can be pivotally supported to the main body 100A so that it can rotate by about 180° around an axis of the vertical direction lying approximately at right angles to the direction of the optical axis Z, for example. In this case, when the display panel 9a looks the same direction as the exposed face of the lens unit 3a, the user can take a self-portrait.

The central control unit 1 controls each unit of the imaging apparatus 100. More specifically, the central control unit 1 includes a CPU (Central Processing Unit), a RAM (Random Access Memory) and a ROM (Read Only Memory) which are not shown in the drawings, and performs various control operations according to various programs for the imaging apparatus 100 (which are not shown in the drawings).

The memory 2 includes, for example, a DRAM (Dynamic Random Access Memory) and temporarily stores data processed by each unit such as the central control unit 1 or the imaging control unit 5.

The imaging unit (an imaging means) 3 captures an image of a subject. More specifically, the imaging unit 3 includes the lens unit 3a, an electronic imaging unit 3b, and an auxiliary light source 3c.

The lens unit 3a includes a plurality of lenses such as a zoom lens, a focus lens, or the like.

The electronic imaging unit 3b includes an image sensor such as a CCD (Charge Coupled Device), a CMOS (Complementary Metal-oxide Semiconductor), or the like, and converts an optical image which has passed various lenses of the lens unit 3a into a two-dimensional image signal. Each of images of different aspect ratios such as 4:3, 16:9, or 1:1 are acquired by securing its aspect ratio in image data acquired by the image sensor and cutting a range of a maximum number of pixels.

The auxiliary light source 3c includes an LED (Light Emitting Diode) light, for example, and emits auxiliary light when shooting an image. Due to the auxiliary light source 3c emitting the auxiliary light, light of sufficient quantity can be input to the electronic imaging unit 3b and focusing is easily performed even in a dark place.

The imaging unit 3 may include a diaphragm (not shown in the drawings) for regulating the amount of light that passes through the lens unit 3a.

The orientation detecting unit (an orientation detecting means) 4 detects an orientation of the imaging apparatus 100.

More specifically, the orientation detecting unit 4 includes an angular velocity sensor, detects an angle of rotation of the imaging apparatus 100 around the optical axis Z of the lens unit 3a (see FIGS. 2A and 2B), and detects an orientation of the imaging apparatus 100 according to the detected rotation angle of rotation. The angle of rotation is detected with respect to a sideway orientation (i.e. the imaging apparatus 100 is held sideways) in which the imaging apparatus 100 is generally used (see FIG. 5A).

Figure 5A:
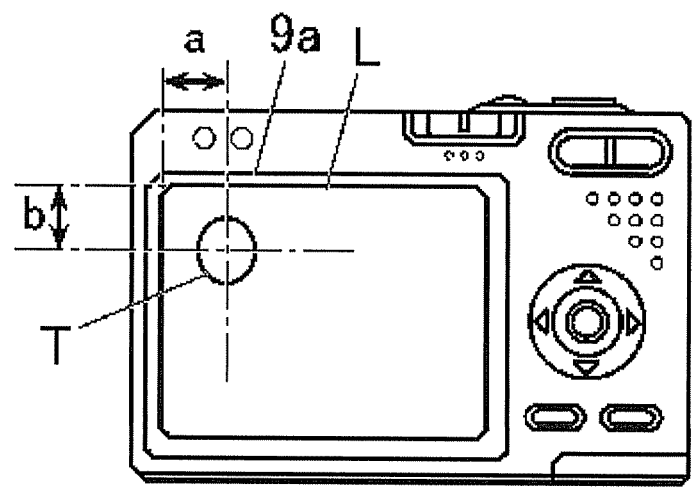
FIGS. 5A, 5B, 5C and 5D show examples of changes in a position of a detection area.

For example, in the case that the angle of rotation of the imaging apparatus 100 is greater than or equal to 0° and smaller than 45°, the orientation detecting unit 4 detects the sideway orientation in which the imaging apparatus 100 is generally used (an orientation of 0°: see FIG. 5A). In the case that the angle of rotation of the imaging apparatus 100 is greater than or equal to 45° and smaller than 135°, the orientation detecting unit 4 detects an upright orientation (an orientation of 90°: see FIG. 5B). In the case that the angle of rotation of the imaging apparatus 100 is greater than or equal to 135° and smaller than 225°, the orientation detecting unit 4 detects an orientation in which the imaging apparatus 100 stands upside down from the sideway direction in which the imaging apparatus 100 is generally used (an orientation of 180°: see FIG. 5C). In the case that the angle of rotation of the imaging apparatus 100 is greater than or equal to 225° and smaller than 315°, the orientation detecting unit 4 detects an upright orientation (an orientation of 270°: see FIG. 5D). In the case that the angle of rotation of the imaging apparatus 100 is greater than or equal to 315° and smaller than 360°, the orientation detecting unit 4 detects the sideway orientation in which the imaging apparatus 100 is generally used (the orientation of 0°: see FIG. 5A).

The configuration of the orientation detecting unit 4 is merely an example and may include an acceleration sensor or a geomagnetism sensor.

The imaging control unit 5 controls imaging of a subject by the imaging unit 3.

The imaging control unit 5 includes, for example, a timing generator, a driver, and the like (not shown in the drawings). Further, the imaging control unit 5 drives scanning of the electronic imaging unit 3b by the timing generator and the driver to convert an optical image into a two-dimensional image signal every predetermined period by the electronic imaging unit 3b, reads out a frame image for each screen from an imaging region of the electronic imaging unit 3b and outputs the frame image to the image data generating unit 6. Further, the imaging control unit 5 performs control for adjusting conditions of capturing an image of the subject such as AF (auto-focus), AE (auto-exposure), AWB (auto white balance), and the like.

Further, the imaging control unit 5 includes a state determining unit 5a, a detecting unit 5b, a position changing unit 5c, a position correcting unit 5d, and a shooting processing unit 5e. The units will be described in detail later.

Each of the units of the imaging control unit 5 may include predetermined logic circuits which is an example and not intended to limit the scope of the invention.

The image data generating unit 6 adjusts gain of each color component of RGB for an analog signal of each frame image forwarded from the electronic imaging unit 3b. Then, the image data generating unit 5 executes sampling and holding by a sample and hold circuit (not shown in drawings), executes conversion into digital data by an A/D converter (not shown in drawings), and executes color processing including pixel interpolation processing and γ correction processing by a color processing circuit (not shown in drawings). Then, the image data generating unit 6 generates a digital brightness signal Y and color difference signals Cb and Cr (YUV data).

The image data generating unit 6 transmits the generated image data to the memory 2 used as a buffer memory or the image recording unit 8.

The storage unit 7 is a non-volatile readable/writable memory such as a flash memory or an EEPROM (Electrically Erasable and Programmable Read Only Memory). In the storage unit 7, there are stored setting information 7a, coordinate change information 7b, coordinate correction information 7c, and the like.

Figure 3A:
FIG. 3A shows contents of setting information stored in a storage unit of the imaging apparatus of FIG. 1.

The setting information 7a is information relating to a coordinate position of a detection area T relative to the upper left hand corner (a predetermined point) within a live view image L. More specifically, as shown in FIG. 3A, the setting information 7a includes a coordinate "a" in the horizontal direction and a coordinate "b" in the vertical direction from an upper left part of a live view image L for an orientation of the imaging apparatus 100 at the time of setting (for example, the orientation of 0°), a size "X" in the horizontal direction of the live view image L, a size "Y" in the vertical direction of the live view image L, and the orientation "d" of the imaging apparatus 100 (a direction).

Figure 3B:
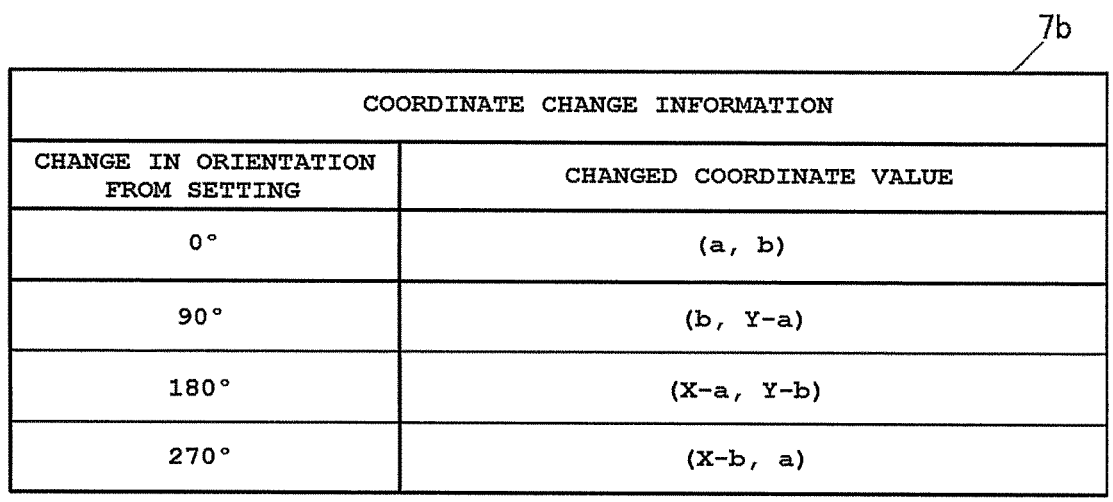
FIG. 3B shows contents of coordinate change information.

The coordinate change information 7b is information relating to changed coordinate positions of the detection area T changing according to orientations of the imaging apparatus 100. More specifically, as shown in FIG. 3B, a change of 0° in orientation from the orientation of the imaging apparatus 100 at the time of setting (for example, the orientation of 0°) and corresponding coordinate values (a, b) are stored as the coordinate change information 7b. A change of 90° in orientation from the orientation of the imaging apparatus 100 at the time of setting (for example, the orientation of 0°) is stored in correspondence with changed coordinate values (b, Y-a). A change of 180° in orientation from the orientation of the imaging apparatus 100 at the time of setting (for example, the orientation of 0°) is stored in correspondence with changed coordinate values (X-a, Y-b). A change of 270° in orientation from the orientation of the imaging apparatus 100 at the time of setting (for example, the orientation of 0°) is stored in correspondence with changed coordinate values (X-b, a).

The coordinate correction information 7c relates to correction of coordinate values of the detection area T according to changes in the orientation of the imaging apparatus 100. As shown in FIG. 3C, changes in the orientation of the imaging apparatus 100 and corresponding contents of correction are stored. More specifically, changes in the orientation of the imaging apparatus 100, i.e. "from sideway (the orientation of 0° or 180°) to upright (the orientation of 90° or 270°)" and "from upright (the orientation of 90° or) 270° to sideway (the orientation of 0° or 180°)" are stored in correspondence with contents of correction, for example, "add |X−Y|/2 to x coordinate".

The image recording unit 8 includes a non-volatile memory (a flash memory), for example. The image recording unit 8 records image data of various images encoded according to a predetermined encoding method by an encoding unit (not shown in the drawings) of the image data generating unit 6.

In the present embodiment, the image recording unit 8 records image data of an image captured by the imaging unit 3 and taken by the shooting processing unit 5e which will be described later, for example.

Further, the image recording unit 8 may be installed with a removable recording medium (not shown in the drawings) and read/write data from/to the recording medium, for example.

The display unit 9 displays/plays back a live view image L, a still picture or a moving picture. More specifically, the display unit 9 includes the display panel (a display means) 9a and a display control unit (a display control means) 9b.

The display panel 9a displays an image in a display region. More specifically, the display panel 9a displays live view images L by sequentially updating a plurality of image frames generated by imaging of a subject by the imaging unit 3 in a still picture shooting mode or a moving picture shooting mode at a predetermined playback frame rate. Further, the display panel 9a displays/plays back a still picture or a moving picture selected by the user and stored in the memory 2 or the image recording unit 8 in a playback mode.

For example, the display panel 9a may include a liquid crystal display (LCD) panel, an organic EL display panel, or the like, without limitation.

The display control unit 9b controls the display panel 9a to display an image in its display region based on the live view image L or image data of a predetermined size which is read out from the memory 2 and/or the image recording unit 8 and decoded. More specifically, the display control unit 9b includes a VRAM (Video Random Access Memory), a VRAM controller, a digital video encoder, and the like. The digital video encoder reads the brightness signal Y and the color difference signals Cb and Cr, which have been read out from the memory 2 and stored in the VRAM (not shown in the drawings), via the VRAM controller from the VRAM under control of the central control unit 1. The digital video encoder generates a video signal based on the data and outputs it to the display panel 9a.

In the present embodiment, in the case that the state determining unit 5a determines that the imaging direction of the imaging unit 3 and the display direction of the display panel 9a are almost the same, the display control unit 9b controls the display panel 9a to display live view images L while sequentially updating a plurality of image frames captured by the imaging unit 3 and generated by the image data generating unit 6 at a predetermined frame rate. At the same time, the display control unit 9b reads and acquires image data for indicating start of shooting such as a start indicator stored in a predetermined storage means (for example, the memory 2) and controls the display panel 9a to on-screen-display the image data so that the image data is superposed onto the detection area T of each of the live view images L.

The manipulation input unit (a setting means) 10 is used to input various instructions to the main body of the apparatus.

More specifically, the manipulation input unit 10 includes a manipulation unit including a shutter button, a right or left and top or bottom cursor button relating to an instruction of selection of an operation mode, a function, or the like, a decision button, or the like, for example.

In the case that the user manipulates a button of the manipulation unit, the manipulation input unit 10 outputs an operation instruction according to the manipulated button to the central control unit 1. The central control unit 1 controls each unit to execute a predetermined action according to the operation instruction input from the manipulation input unit 10.

In the present embodiment, the setting information 7a stored in the storage unit 7 can be arbitrarily set according to an operation instruction input from the manipulation input unit 10. The setting information 7a may include the coordinate "a" in the horizontal direction and the coordinate "b" in the vertical direction from an upper left part of the live view image L for an orientation of the imaging apparatus 100 at the time of setting (for example, the orientation of 0°).

The manipulation input unit 10 may include a touch panel (not shown in the drawings) which is incorporated into the display panel 9a.

The state determining unit 5a of the imaging control unit 5 determines a state of the imaging apparatus 100.

In other words, the state determining unit 5a determines whether or not the imaging apparatus 100 is in a state where a subject can visually recognize an image of oneself captured by the imaging unit 3 and displayed by the display unit 9 (a so-called self-portrait state).

More specifically, the state determining unit 5a determines whether or not the imaging direction of the imaging unit 3 (a direction in which the lens unit 3a is exposed) and the display direction of the display panel 9a are almost the same when an image of the subject is captured by the imaging unit 3. For example, the state determining unit 5a determines whether or not the imaging direction of the imaging unit 3 and the display direction of the display panel 9a are almost the same based on a detection signal of a switch for mechanically detecting rotation of the display panel 9a of about 180° with respect to the main body 100A (not shown in the drawings) or a sensor for detecting an inclination of the display panel 9a with respect to the direction of gravity (for example, an acceleration sensor not shown in the drawings).

In the case that the state determining unit 5a determines whether or not the imaging direction of the imaging unit 3 and the display direction of the display panel 9a are almost the same, the imaging apparatus 100 is regarded as being in a state in which the subject can visually recognize an image of oneself captured by the imaging unit 3 and displayed by the display unit 9.

The detecting unit (a subject detecting means) 5b detects an object to be detected from an image captured by the imaging unit 3.

More specifically, the detecting unit 5b performs a motion detection process for detecting an object to be detected (for example, a movement of a subject) by detecting changes in images based on changes in pixel values of a detection area (corresponding to the detection area T in the live view images L) of images subsequently captured (corresponding to the live view images L).

The motion detection process can be realized by using any of the well-known technologies. Thus, detailed description of the motion detection process is omitted.

Further, a start indicator for starting the motion shutter is On-Screen-Displayed (OSD) in the detection area T.

The position changing unit (a position changing means) 5c changes the position of the detection area T in the live view image L corresponding to the detection area in the captured image according to the orientations of the imaging apparatus 100 detected by the orientation detecting unit 4.

More specifically, the position changing unit 5c changes the position of the detection area T in the live view image L so that a positional relationship of the detection area T relative to the live view image L is maintained in the horizontal and vertical directions with respect to the direction of gravity according to the orientations of the imaging apparatus 100 detected by the orientation detecting unit 4.

In the present embodiment, the position changing unit 5c changes the position of the detection area T in the live view image L based on the information relating to the coordinate position and the information relating to the changed coordinate positions stored in the storage unit 7 as the setting information 7a and the coordinate change information 7b, respectively, in the case that the orientation of the imaging apparatus 100 is detected by the orientation detecting unit 4. The coordinates on the live view image L are stored as the information relating to the coordinate position. When the position of the detection area T is changed in a captured image, the information relating to the coordinate position is changed to coordinates of the detection area on the captured image. Further, in the case that the aspect ratio of the captured image changes, the aspect ratio of the live view image L changes accordingly. As coordinates on the live view image L are sometimes different from those on the display unit 9, the coordinates on the display unit 9 may be set as the setting information 7a in order to prevent it from being affected by the aspect ratio.

More specifically, as shown in FIG. 5A, in the case that the orientation of the imaging apparatus 100 detected by the orientation detecting unit 4 is the sideway orientation (the orientation of 0°) in which the imaging apparatus 100 is generally used, i.e. a change in the orientation from the orientation of the imaging apparatus 100 at the time setting (for example, the orientation of 0°) is 0°, the position changing unit 5c sets the coordinate position of the detection area T to (a, b) by referring to the setting information 7a and the coordinate change information 7b stored in the storage unit 7. It is supposed that the coordinates of the upper left hand corner (a predetermined point) within the live view image L when the orientation of the imaging apparatus 100 is 0° as shown in FIG. 5A, are (0, 0). Further, when the orientation of the imaging apparatus 100 is 0°, the longer side of the live view image L is in the X-axis direction and the shorter side is in the Y-axis direction.

Figure 5B:
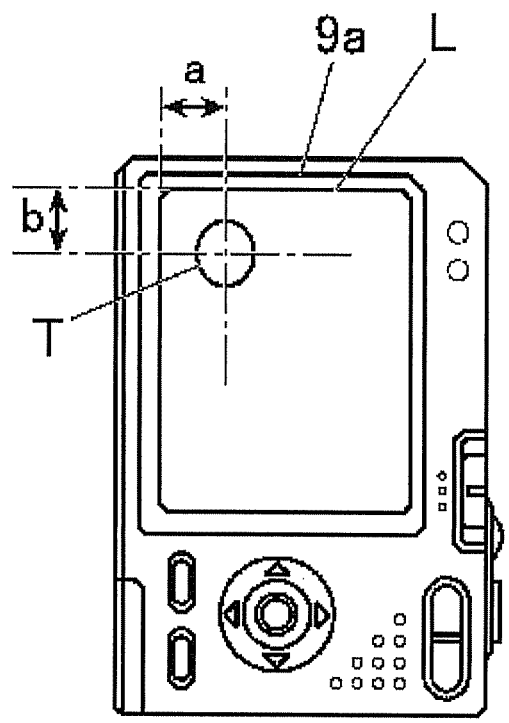

As shown in FIG. 5B, in the case that the orientation of the imaging apparatus 100 detected by the orientation detecting unit 4 is the upright orientation (the orientation of 90°), i.e. a change in the orientation from the orientation of the imaging apparatus 100 at the time setting (for example, the orientation of 0°) is 90°, the position changing unit 5c sets the coordinate position of the detection area T to (b, Y-a) by referring to the setting information 7a and the coordinate change information 7b stored in the storage unit 7.

Figure 5C:
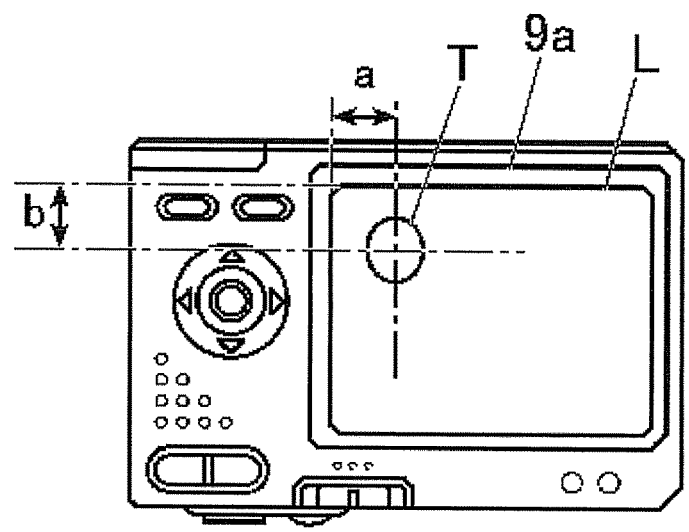

As shown in FIG. 5C, in the case that the orientation of the imaging apparatus 100 detected by the orientation detecting unit 4 is the sideway orientation (the orientation of 180°), i.e. a change in the orientation from the orientation of the imaging apparatus 100 at the time setting (for example, the orientation of 0°) is 180°, the position changing unit 5c sets the coordinate position of the detection area T to (X-a, Y-b) by referring to the setting information 7a and the coordinate change information 7b stored in the storage unit 7.

Figure 5D:
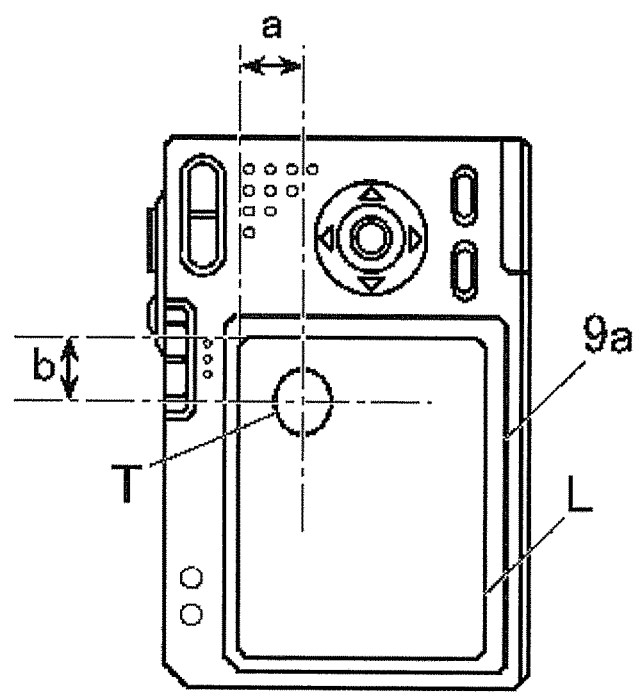

As shown in FIG. 5D, in the case that the orientation of the imaging apparatus 100 detected by the orientation detecting unit 4 is the upright orientation (the orientation of 270°), i.e. a change in the orientation from the orientation of the imaging apparatus 100 at the time setting (for example, the orientation of 0°) is 270°, the position changing unit 5c sets the coordinate position of the detection area T to (X-b, a) by referring to the setting information 7a and the coordinate change information 7b stored in the storage unit 7.

As described above, the position changing unit 5c changes the coordinate position of the detection area T according to the orientation of the imaging apparatus 100 detected by the orientation detecting unit 4. Thus, the detection area T can be always set to a position at a distance a in the horizontal direction and a distance b in the vertical direction from a predetermined point in the upper left part of the live view image L.

The position correcting unit (a position correcting means) 5d corrects the position of the detection area T changed by the position changing unit 5c.

More specifically, in the present embodiment, the position correcting unit 5d determines whether or not the aspect ratio of the live view image L is one (1). In the case that it is determined that the aspect ratio is not one, the position correcting unit 5d determines whether or not the orientation of the imaging apparatus 100 at the time of setting is the same as the orientation of the imaging apparatus 100 at the present time.

In the case that it is determined that the orientation of the imaging apparatus 100 at the time of setting is not the same as the orientation of the imaging apparatus 100 at the present time, the position correcting unit 5d executes branch processing according to the changes in the orientation of the imaging apparatus 100. In the case that the change in the orientation of the imaging apparatus 100 is determined to be a change "from the sideway direction to the upright direction" (for example, the orientation of 0° to the orientation of 90°) or "from the upright direction to the sideway direction" (for example, the orientation of 90° to the orientation of 0°), the position correcting unit 5d determines what correction to perform from the coordinate correction information 7c stored in the storage unit 7 according to the x coordinate position of the detection area T after the change of the orientation. More specifically, as shown in FIG. 3C, in the case that the value of the x coordinate of the detection area T after the change of the orientation is smaller than (½)X, the position correcting unit 5d determines to perform correction to "add |X−Y|/2 to the value of the x coordinate". In the case that the value of the x coordinate of the detection area T is the same as (½)X, the position correcting unit 5d determines to perform no correction. In the case that the value of the x coordinate of the detection area T is greater than (½)X, the position correcting unit 5d determines to perform correction to "subtract |X−Y|/2 from the value of the x coordinate".

Further, the position correcting unit 5d corrects the coordinates of the detection area T based on the determination.

Figure 5E:
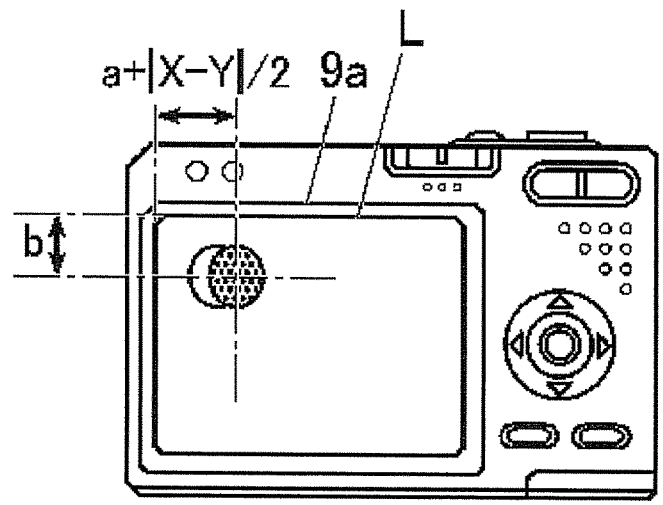
FIGS. 5E and 5F show examples of correction of the position of the detection area.

For example, as shown in FIG. 5E, in the case that the orientation of the imaging apparatus 100 is changed from the orientation of 90° to the orientation of 0° (in the case that the x coordinate a of the detection area T after the change of the orientation is smaller than (½)X), the position correcting unit 5d corrects the present coordinates (a, b) of the detection area T to (a+|X−Y|/2, b) according to the correction to "add |X−Y|/2 to the value of the x coordinate". Thus, the position correcting unit 5d corrects the position of the detection area T so that the detection area T moves toward the center in the horizontal direction of the live view image L in the case that the longer side of the live view image L approaches the horizontal direction with respect to the direction of gravity as a result of the change of the orientation of the imaging apparatus 100.

Figure 5F:
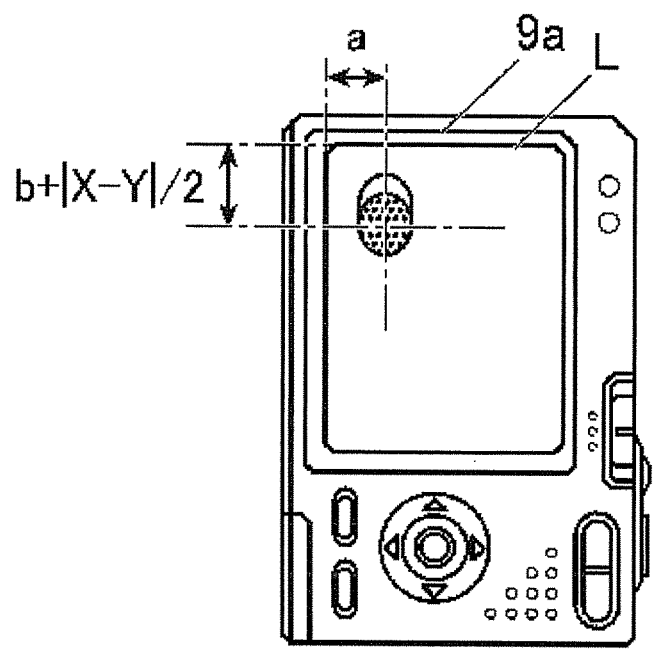

As shown in FIG. 5F, in the case that the orientation of the imaging apparatus 100 is changed from the orientation of 0° to the orientation of 90° (in the case that the x coordinate b of the detection area T after the change of the orientation is smaller than (½)X), the position correcting unit 5d corrects the present coordinates (b, Y−a) of the detection area T to (b+|X−Y|/2, Y−a) according to the correction to "add |X−Y|/2 to the value of the x coordinate". Thus, the position correcting unit 5d corrects the position of the detection area T so that the detection area T moves toward the center in the vertical direction of the live view image L in the case that the longer side of the live view image L approaches the vertical direction with respect to the direction of gravity as a result of the change of the orientation of the imaging apparatus 100.

The shooting processing unit 5e performs a process of shooting an image of the subject.

In the present embodiment, in the case that a movement of the subject is detected by the detecting unit 5b, the shooting processing unit 5e performs the process of shooting an image of the subject by the imaging unit 3.

<Motion Shutter Mode Process>

In the following, a motion shutter mode process by the imaging apparatus 100 according to the present embodiment will be described with reference to FIG. 4.

Figure 4:
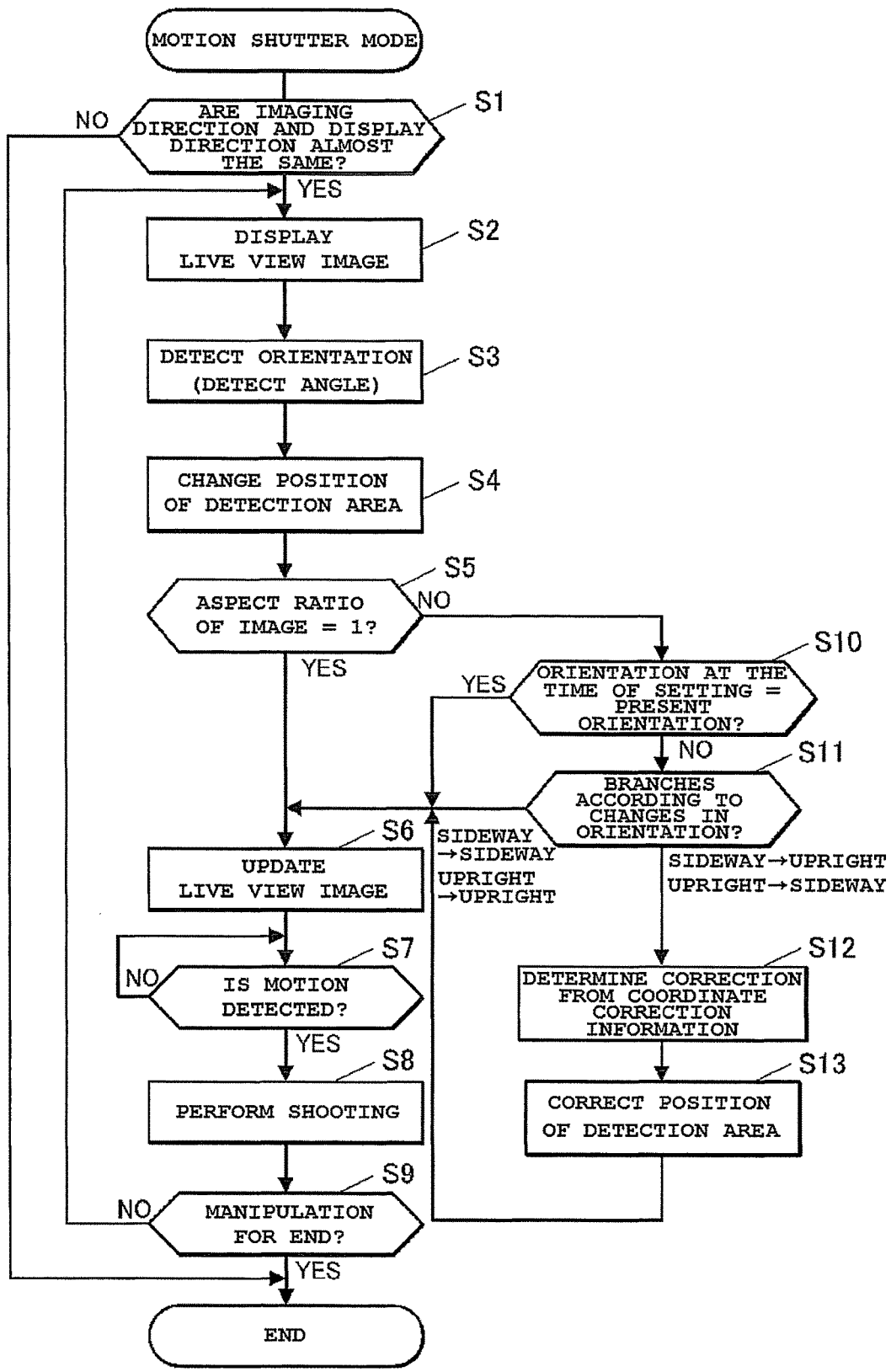
FIG. 4 is an exemplary flow chart for showing steps of a motion shutter mode process performed by the imaging apparatus shown in FIG. 1.

FIG. 4 is an exemplary flow chart for showing steps of the motion shutter mode process.

As shown in FIG. 4, the state determining unit 5a determines whether or not the imaging apparatus 100 is in a state where the imaging direction of the imaging unit 3 and the display direction of the display panel 9a are almost the same (Step S1). In other words, the state determining unit 5a determines whether or not the display panel 9a has been rotated by about 180° with respect to the main body 100A.

In the case that it is determined at Step S1 that the imaging direction of the imaging unit 3 and the display direction of the display panel 9a are not almost the same (Step S1; NO), the motion shutter mode process ends.

On the other hand, in the case that it is determined at Step S1 that the imaging direction of the imaging unit 3 and the display direction of the display panel 9a are almost the same (Step S1; YES), the display control unit 9b controls the display panel 9a to display live view images L while sequentially updating a plurality of image frames captured by the imaging unit 3 and generated by the image data generating unit 6 at a predetermined playback frame rate (Step S2).

Then, the orientation detecting unit 4 detects an angle of rotation of the imaging apparatus 100 around the optical axis Z of the lens unit 3a (see FIG. 2) and detects an orientation of the imaging apparatus 100 according to the detected angle of rotation (Step S3).

Then, the position changing unit 5c changes the position of the detection area T in the live view image L based on the information relating to the coordinate position and the information relating to the changed coordinate positions stored in the storage unit 7 as the setting information 7a and the coordinate change information 7b, respectively (Step S4).

Then, the position correcting unit 5d determines whether or not the aspect ratio of the live view image L is one (1) (Step S5).

In the case that it is determined at Step S5 that the aspect ratio is one (1) (Step S5; YES), the display control unit 9b updates display of the live view image L (Step S6). At this time, the display control unit 9b performs display of the start indicator so that it is superposed onto the position of the detection area T.

Then, the detecting unit 5b performs the motion detection process (Step S7).

In the case that it is determined at Step S7 that no motion (movement of the subject) is detected by the detecting unit 5b (Step S7; NO), the detecting unit 5b continues to perform detection.

On the other hand, in the case that it is determined at Step S7 that a motion (movement of the subject) is detected by the detecting unit 5b (Step S7; YES), the shooting processing unit 5e performs the process of shooting an image of the subject (Step S8).

Then, the imaging control unit 5 determines whether or not a predetermined manipulation is performed to instruct the detecting unit 5b to end the detection (Step S9).

In the case that it is determined at Step S9 that the predetermined manipulation is not performed to instruct the detecting unit 5b to end the detection (Step S9; NO), the process returns to Step S2.

On the other hand, in the case that it is determined at Step S9 that the predetermined manipulation is performed to instruct the detecting unit 5b to end the detection (Step S9; YES), the motion shutter mode process ends.

In the case that it is determined at Step S5 that the aspect ratio is not one (1) (Step S5; NO), the position correcting unit 5d determines whether or not the orientation of the imaging apparatus 100 at the time of setting the setting information 7a stored in the storage unit 7 and the present orientation of the imaging apparatus 100 are the same (Step S10).

In the case that it is determined at Step S10 that the orientation of the imaging apparatus 100 at the time of setting and the present orientation of the imaging apparatus 100 are the same (Step S10; YES), the process proceeds to Step S6 and then Steps S7 to S9 are performed.

On the other hand, in the case that it is determined at Step S10 that the orientation of the imaging apparatus 100 at the time of setting and the present orientation of the imaging apparatus 100 are not the same (Step S10; NO), the position correcting unit 5d executes branch processing according to the changes in the orientation of the imaging apparatus 100 (Step S11).

In the case that the change in the orientation of the imaging apparatus 100 is determined to be a change "from the sideway direction to the sideway direction" (for example, the orientation of 0° to the orientation of 180°) or "from the upright direction to the upright direction" (for example, the orientation of 90° to the orientation of 270°) at Step S11, the process proceeds to Step S6 and Steps S7 to S9 are performed.

On the other hand, in the case that the change in the orientation of the imaging apparatus 100 is determined to be a change "from the sideway direction to the upright direction" (for example, the orientation of 0° to the orientation of 90°) or "from the upright direction to the sideway direction" (for example, the orientation of 90° to the orientation of 0°) at Step S11, the position correcting unit 5d determines what correction to perform from the coordinate correction information 7c stored in the storage unit 7 (Step S12). More specifically, as shown in FIG. 3C, in the case that the value of the x coordinate of the detection area T after the change of the orientation is smaller than (½)X, the position correcting unit 5d determines to perform correction to "add |X−Y|/2 to the value of the x coordinate". In the case that the value of the x coordinate of the detection area T is the same as (½)X, the position correcting unit 5d determines to perform no correction. In the case that the value of the x coordinate of the detection area T is greater than (½)X, the position correcting unit 5d determines to perform correction to "subtract |X−Y|/2 from the value of the x coordinate".

The position correcting unit 5d corrects the present coordinates of the detection area T based on the determination (Step S13). Then, the process proceeds to Step S6 and Steps S7 to S9 are performed.

As described above, according to the imaging apparatus 100 of the present embodiment, the position of the detection area in the captured image changes according to the orientation of the imaging apparatus 100 detected by the orientation detecting unit 4.

Therefore, it is possible to set the detection area to a proper position without a lot of trouble in the case that the orientation of an imaging apparatus 100 changes.

Further, according to the imaging apparatus 100 of the present embodiment, the position of the detection area T in the captured image changes so that a positional relationship of the detection area relative to the captured image is maintained in the horizontal and vertical directions with respect to the direction of gravity according to the orientations of the imaging apparatus 100 detected by the orientation detecting unit 4.

Therefore, it is possible to always place the detection area in a predetermined position for a subject displayed in a captured image (for example, a person) even in the case that the orientation of the imaging apparatus 100 changes.

By this, it is possible to always detect the subject (motion detection) at the user's desired position even in the case the orientation of the imaging apparatus 100 changes.

Further, according to the imaging apparatus 100 of the present embodiment, in the case that the orientation of the imaging apparatus 100 is detected by the orientation detecting unit 4, the position of the detection area in the captured image is changed based on the setting information 7a and the coordinate change information 7b stored in the storage unit 7. Thus, it is possible to reduce efforts to calculate a position of the detection area after the orientation of the imaging apparatus 100 changes whenever the change is detected.

Furthermore, according to the imaging apparatus 100 of the present embodiment, it is possible to improve usability of the subject detection (i.e. the motion shutter) because the setting information 7a stored in the storage unit 7 can be arbitrarily set.

Further, according to the imaging apparatus 100 of the present embodiment, the position of the detection area changed by the position changing unit 5c is corrected according to the changes in the orientation of the imaging apparatus 100 in the case that the aspect ration of the captured image is not one (1).

More specifically, the position of the detection area can be corrected so that the detection area moves toward the center in the horizontal direction of the captured image in the case that the longer side of the captured image approaches the horizontal direction with respect to the direction of gravity as a result of the change of the orientation of the imaging apparatus 100. Further, the position of the detection area can be corrected so that the detection area moves toward the center in the vertical direction of the captured image in the case that the longer side of the captured image approaches the vertical direction with respect to the direction of gravity as a result of the change of the orientation of the imaging apparatus 100.

By this, even if the direction of the captured image changes from the sideway direction to the upright direction or from the upright direction to the sideway direction when the orientation of the imaging apparatus 100 changes, the detection area can be moved to a corresponding position in the image after the change. Therefore, it is possible to improve usability of the subject detection (i.e. the motion shutter).

Further, according to the imaging apparatus 100 of the present embodiment, the orientation detecting unit 4 detects the orientation of the imaging apparatus 100 according to the angle of rotation of the imaging apparatus 100 around the optical axis Z of the lens unit 3a included in the imaging unit 3. Therefore, it is possible to properly detect the sideway orientation and the upright orientation of the imaging apparatus 100.

Furthermore, according to the imaging apparatus 100 of the present embodiment, a live view image L corresponding to the captured image, and an indicator image indicating a position of the detection area T in the live view image L corresponding to the detection area in the captured image are displayed in the display panel 9a. According to a change in the position of the detection area, the position in which the indicator image is displayed is updated. Therefore, it is possible to improve usability of the subject detection (i.e. the motion shutter).

Further, the present invention is not limited to the embodiments described above and various modification or design changes of the embodiments can be made without departing from the objects of the invention.

For example, according to the embodiment described above, the position correcting unit 5d corrects to add or subtract a predetermined amount of correction of (|X−Y|/2) to or from the x coordinate of the coordinate values of the detection area T. The present invention is not limited to this embodiment. In other embodiments, the amount of correction can be arbitrarily set according to applications or the user's preference. Further, in some embodiments, the imaging apparatus has a mode of performing correction by the position correcting unit 5d (ON mode) and a mode of performing no correction by the position correcting unit 5d (OFF mode) and the user can select one of the modes.

The object to be detected by the detecting unit 5b is not limited to the subject's movement. For example, the object may be a color or a shape of a predetermined object. In this case, the same effects can be achieved as the embodiment for detecting the subject's movement.

According to the embodiment described above, the motion detection is performed in the case that it is determined that the imaging direction of the imaging unit 3 and the display direction of the display panel 9a are almost the same. However, the present invention is not limited to this embodiment. In other embodiments, it can be arbitrarily set whether to perform the motion detection.

Further, in the embodiment described above, the upper left hand corner within the live view image L is the predetermined point used as a reference. The present invention is not limited to this embodiment. In other embodiments, the predetermined point can be placed at a different position, for example, the center of the live view image L.

The configuration of the imaging apparatus 100 of the embodiment is merely an example, and the present invention is not limited to this configuration. For example, the imaging apparatus 100 can be a portable terminal such as a smart phone provided with an imaging function. For example, in the case of taking a self-portrait by using the portable terminal in the same way as the embodiment, a lens unit of an imaging unit (a so-called in-camera) exposed in the same direction as a display panel of the portable terminal may be used to make a subject visually recognize a moving picture of itself imaged by the imaging unit and displayed by the display panel.

In addition, according to the embodiment, the functions of the orientation detecting means, the subject detecting means, and the position changing means are realized by driving the orientation detecting unit, the detecting unit, and the position changing unit under the control of the central control unit 1. However, the present invention is not limited to the above and the functions may be realized by executing predetermined programs by the CPU of the central control unit 1.

In other words, a program including an orientation detecting processing routine, a subject detecting processing routine, and a position changing processing routine is stored in a program memory (not shown in the drawings). The CPU of the central control unit 1 can function as a means for detecting the orientation of the imaging apparatus 100 including the imaging unit 3 according to the orientation detecting processing routine. The CPU of the central control unit 1 can function as a means for detecting a subject from a predetermined detection area in an image captured by the imaging unit 3 according to the subject detecting processing routine. According to the position changing processing routine, the CPU of the central control unit 1 can function as a means for changing the position of the predetermined detection area in the captured image according to the orientation of the imaging apparatus 100 detected by the orientation detecting processing routine.

In addition, a computer readable recording medium for recording the program for executing the respective processing can be a ROM, a hard disk, a non-volatile memory such as a flash memory, a portable storage medium such as a CD-ROM, or the like. A carrier wave can be used as a medium for providing program data through a predetermined communication line.

Although some embodiments of the present invention have been described above, the embodiments are for illustrative purposes only and not intended to limit the technical scope of the present invention. It will be evident that there are many other possible embodiments of the present invention and various modifications such as omission or substitution may be made without departing from the spirit of the invention. These embodiments and modifications fall within the scope and the spirit of the invention described in this specification and within the scope of the invention as defined in the appended claims and equivalents thereof.

What is claimed is:

1. A detecting apparatus for detecting a motion of a subject comprising:
   an imaging unit; and
   a CPU that is configured to:
      perform orientation detection to detect an orientation of the detecting apparatus;
      perform subject's motion detection to detect a motion of a subject in a predetermined detection area in an image captured by the imaging unit;
      perform position change to change a coordinate position of the predetermined detection area in the image according to the detected orientation of the detecting apparatus; and
      perform process execution to execute a predetermined process based on the detected motion of the subject in the predetermined detection area whose coordinate position is changed according to the detected orientation of the detecting apparatus.

2. The detecting apparatus of claim 1, wherein the CPU performs the position change to change the coordinate position of the predetermined detection area in the image so that a coordinate positional relationship of the predetermined detection area relative to the image is maintained in the horizontal and vertical directions with respect to the direction of gravity according to the detected orientation of the detecting apparatus.

3. The detecting apparatus of claim 1 further comprising:
   a storage unit for storing information relating to a coordinate position of the predetermined detection area with reference to a predetermined point in the image and information relating to changed coordinate positions of the predetermined detection area changing according to orientations of the detecting apparatus,
   wherein the CPU performs the position change to change the coordinate position of the predetermined detection area in the image based on the information relating to the coordinate position and the information relating to the changed coordinate positions stored in the storage unit in the case that the orientation of the detecting apparatus is detected.

4. The detecting apparatus of claim 3, wherein the CPU is configured to further perform setting to arbitrarily set the information relating to the coordinate position stored in the storage unit.

5. The detecting apparatus of claim 1, wherein the CPU is configured to further perform position correction to correct the coordinate position of the predetermined detection area changed by the operation to change the coordinate position of the predetermined detection area according to a change in the orientation of the detecting apparatus in the case that the aspect ratio of the image is not one (1).

6. The detecting apparatus of claim 5, wherein the CPU performs the position correction to correct the coordinate position of the predetermined detection area so that the predetermined detection area moves toward the center in the horizontal direction of the image in the case that the longer side of the image approaches the horizontal direction with respect to the direction of gravity as a result of the change of the orientation of the detecting apparatus.

7. The detecting apparatus of claim 5, wherein the CPU performs the position correction to correct the coordinate position of the predetermined detection area so that the predetermined detection area moves toward the center in the vertical direction of the image in the case that the longer side of the image approaches the vertical direction with respect to the direction of gravity as a result of the change of the orientation of the detecting apparatus.

8. The detecting apparatus of claim 1, wherein the CPU performs the orientation detection to detect the orientation of the detecting apparatus according to an angle of rotation of the detecting apparatus around an optical axis of a lens included in the imaging unit.

9. The detecting apparatus of claim 1, wherein the CPU is configured to further perform display control to control a display unit to display the image and an indicator image indicating the coordinate position of the predetermined detection area, and the CPU performs the display control to further update the position in which the indicator image is displayed according to a change in the coordinate position of the predetermined detection area.

10. The detecting apparatus of claim 1 further comprising a display unit, wherein the CPU is further configured to detect the orientation of the detecting apparatus in the case that the display direction of the display unit is substantially the same as the imaging direction of the imaging unit.

11. The detecting apparatus of claim 1, wherein the imaging unit captures an image in the case that the motion of the subject is detected.

12. The detecting apparatus of claim 1, wherein the CPU performs the position change to change the coordinate position of the predetermined detection area in the image according to the detected orientation of the detecting apparatus while maintaining the size and the shape of the predetermined detection area.

13. The detecting apparatus of claim 1 further comprising a display unit, wherein the display unit displays the image and an indicator image indicating a position of the predetermined detection area, and the CPU controls the display unit to update the position in which the indicator image is displayed according to a change in the position of the predetermined detection area.

14. The detecting apparatus of claim 1 further comprising a display unit, wherein the display unit displays the image and an indicator image indicating a position of the predetermined detection area, and the CPU perform the position change to change the coordinate position of the predetermined detection area in the image according to the detected orientation of the detecting apparatus except the center of a display region of the display unit while maintaining the size of the predetermined detection area.

15. The detecting apparatus of claim 1, wherein the CPU performs the process execution to execute an image shooting process of the subject.

16. The detecting apparatus of claim 1, wherein the CPU performs the position change to change a coordinate position of the predetermined detection area in the image according to the detected orientation of the detecting apparatus while maintaining the size of the predetermined detection area.

17. A detection control method performed by a detecting apparatus comprising:
    detecting an orientation of the detecting apparatus including an imaging unit;
    detecting a motion of a subject in a predetermined detection area in an image captured by the imaging unit;
    changing a coordinate position of the predetermined detection area in the image according to the detected orientation of the detecting apparatus; and
    executing a predetermined process based on the detected motion of the subject in the predetermined detection area whose coordinate position is changed according to the detected orientation of the detecting apparatus.

18. A non-transitory computer-readable recording medium for recording a computer program, the computer program causing a processor of a detecting apparatus to execute functions comprising:
    an orientation detecting function for detecting an orientation of the detecting apparatus including an imaging unit;
    a subject's motion detecting function for detecting a motion of a subject in a predetermined detection area in an image captured by the imaging unit; and
    a position changing function for changing a coordinate position of the predetermined detection area in the image according to the orientation of the detecting apparatus detected by the orientation detecting function; and
    a process execution function for executing a predetermined process based on the detected motion of the subject in the predetermined detection area whose coordinate position is changed according to the detected orientation of the detecting apparatus.

* * * * *